(12) United States Patent
Elwell

(10) Patent No.: US 6,986,597 B2
(45) Date of Patent: Jan. 17, 2006

(54) LIGHTED VEHICLE GRILLE

(75) Inventor: James P. Elwell, Johnston, IA (US)

(73) Assignee: Putco, Inc., Story City, IA (US)

( * ) Notice: Subject to any disclaimer, the term of this patent is extended or adjusted under 35 U.S.C. 154(b) by 81 days.

(21) Appl. No.: 10/699,714

(22) Filed: Nov. 3, 2003

(65) Prior Publication Data

US 2005/0094409 A1     May 5, 2005

(51) Int. Cl.
*B60Q 1/28*     (2006.01)

(52) U.S. Cl. .................. 362/496; 362/540; 362/545

(58) Field of Classification Search ............. 362/464, 362/496, 540, 545, 548, 549; 340/468, 469, 340/471, 472, 477, 478

See application file for complete search history.

(56) References Cited

U.S. PATENT DOCUMENTS

| | | | |
|---|---|---|---|
| 4,791,402 A * | 12/1988 | Vaughn | 340/468 |
| 5,188,445 A * | 2/1993 | Haun et al. | 362/542 |
| 5,373,426 A * | 12/1994 | O'Sullivan | 362/496 |
| 5,798,691 A * | 8/1998 | Tim Kao | 340/479 |
| 6,190,026 B1 * | 2/2001 | Moore | 362/487 |
| 6,238,070 B1 * | 5/2001 | Galliner et al. | 362/505 |
| D466,453 S | 12/2002 | Elwell et al. | |

* cited by examiner

Primary Examiner—Stephen Husar
Assistant Examiner—Hargobind S. Sawhney
(74) Attorney, Agent, or Firm—McKee, Voorhees & Sease, P.L.C.

(57) ABSTRACT

A lighted vehicle grille includes a grille or grille insert mounted to the front of a vehicle with a plurality of lights mounted to the vehicle grille. The lights may be mounted within holes in the grille or may be otherwise attached to the grille. The lights are connectable to the electrical circuitry of the vehicle, and are adapted to turn on simultaneously with the selective turning on of other vehicle lights.

6 Claims, 3 Drawing Sheets

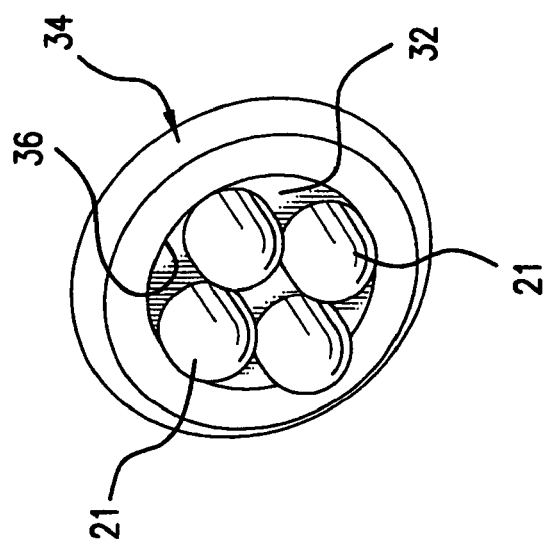
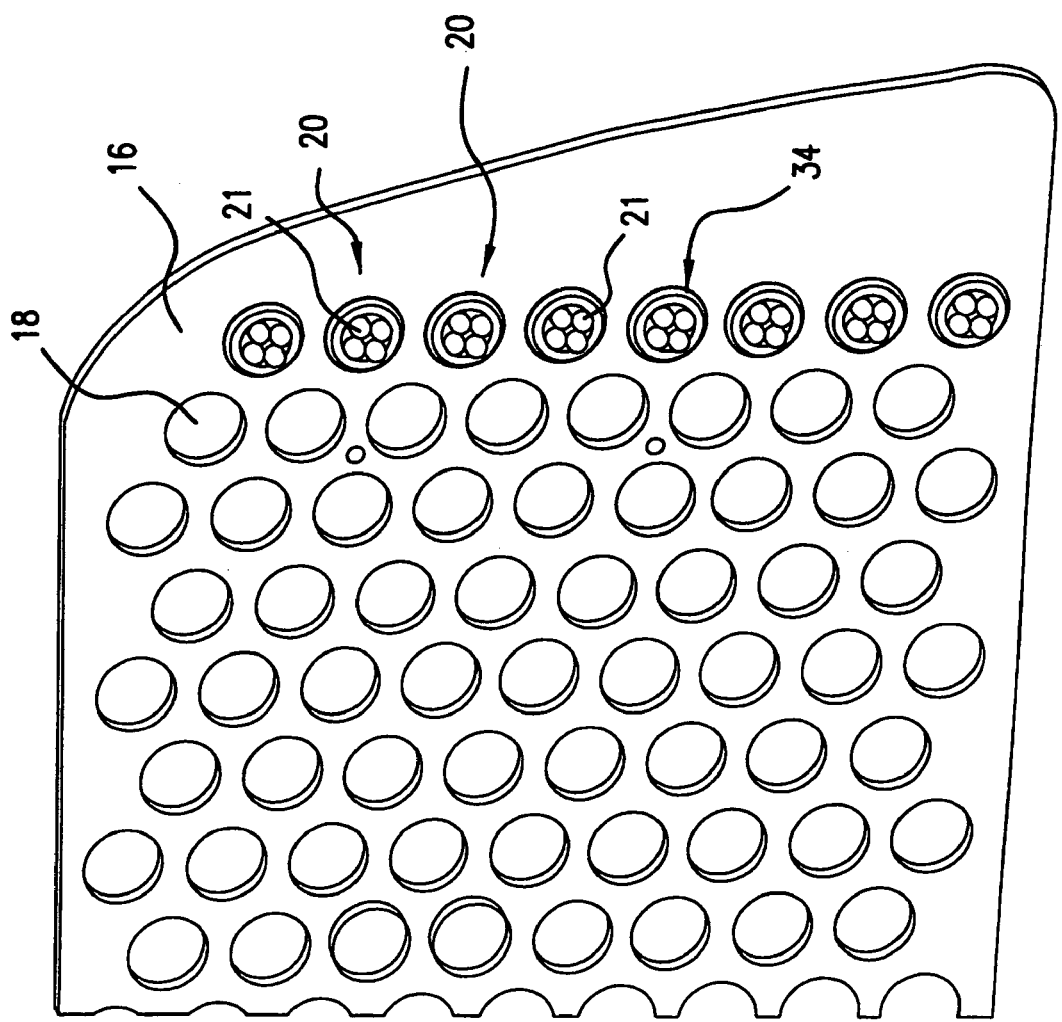

US 6,986,597 B2

LIGHTED VEHICLE GRILLE

BACKGROUND OF THE INVENTION

The present invention relates to a lighted vehicle grille.

Vehicle grilles have become highly decorative, and in some cases grille inserts have been provided which fit over the original grille and improve the decorative features of the original grille. It would be desirable to have either a grille or a grille insert that is capable of having lights mounted thereon.

Therefore a primary object of the present invention is the provision of a lighted vehicle grille.

A further object of the present invention is the provision of a grille insert which includes lights mounted thereon.

A further object of the present invention is the provision of a grille insert with lights mounted thereon that can be connected to the vehicle lighting system.

A further object of the present invention is the provision of a vehicle grille or grille insert that includes openings therein and includes lights mounted in the openings.

A further object of the present invention is the provision of a lighted vehicle grille which includes lights that turn on at the same time that either running lights, headlights, or turn lights are turned on.

A further object of the present invention is the provision of an improved lighted vehicle grille which utilizes LEDs or which can utilize other types of lights.

A further object of the present invention is the provision of an improved lighted vehicle grille that includes lights that are removable from the grille for replacement, or which can be added to the grille as desired.

A further object of the present invention is the provision of a lighted vehicle grille or grille insert that is economical to manufacture, durable in use, and efficient in operation.

BRIEF SUMMARY OF THE INVENTION

The foregoing objects may be achieved by a combination including a vehicle having a grille opening at the front thereof and having a light electrical circuit. A grill is mounted within the grill opening and the grill comprises a plate-like material having a front face, a rear face, and a plurality of grille holes therein. A grille light is mounted to the grille. The light may be connected to the electrical circuit of the vehicle and is capable of selective actuation to activate the light.

According to another feature of the present invention, the grille light is mounted within one of the grille holes.

According to another feature of the present invention, the grille light includes a threaded cylinder extending through the hole and protruding from the front and rear faces of the grille. A front nut is threaded over the cylinder protruding from the front face of the grille and a back nut is threaded over the cylinder protruding from the rear face of the grille.

According to another feature of the present invention, the nuts engage the front and rear faces of the grille to hold the threaded cylinder within the grille hole.

According to another feature of the present invention, the grille light includes wires extending from the rear surface of the grille for electrical connection into the light electrical circuit.

According to another feature of the present invention, the threaded cylinder surrounds one or more LEDs.

BRIEF DESCRIPTION OF THE DRAWINGS

FIG. 2 is an enlarged front elevational view of the grille insert and the lights mounted in the holes thereof.

DETAILED DESCRIPTION OF THE PREFERRED EMBODIMENT

Figure 1:
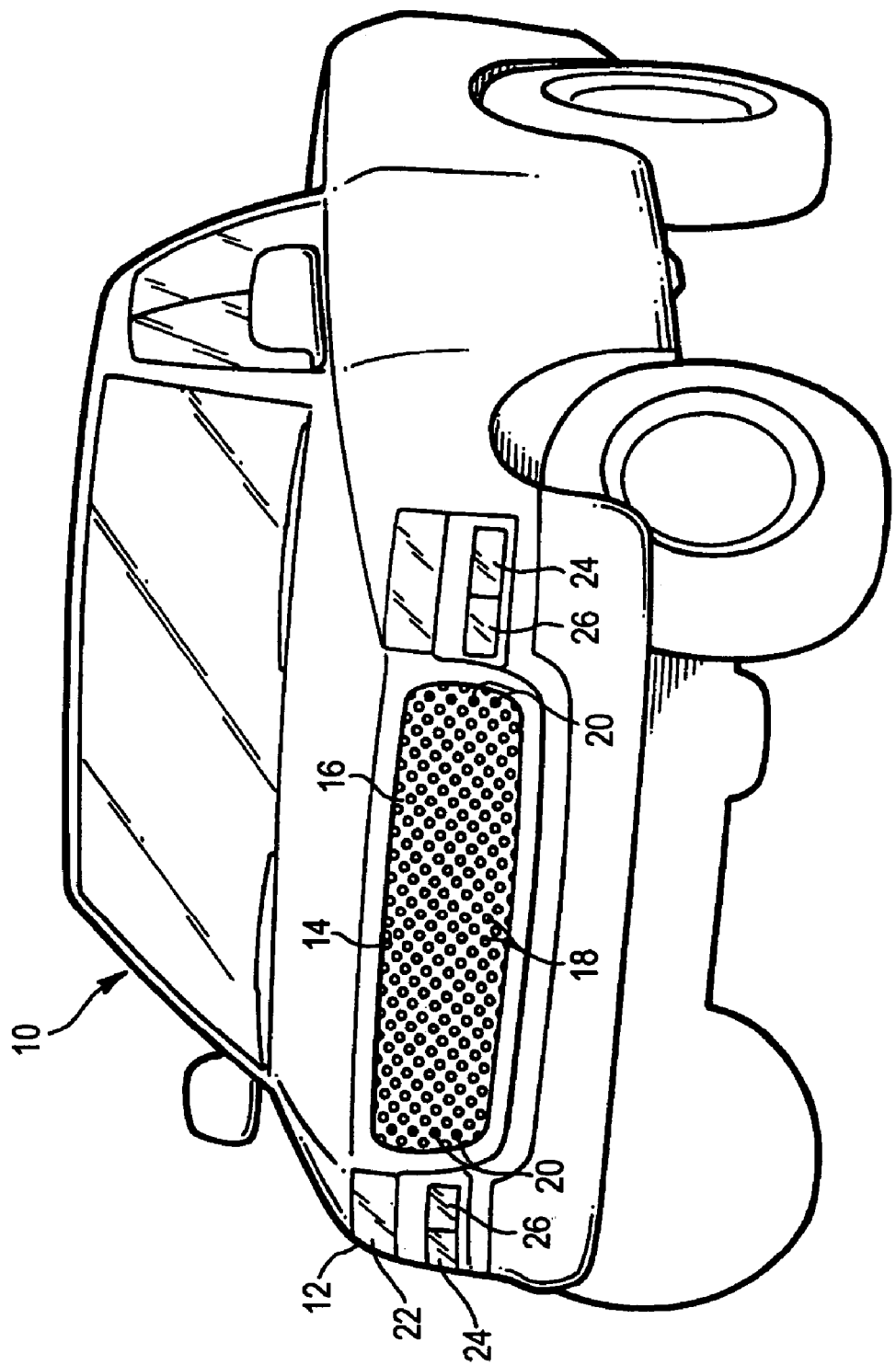
FIG. 1 is a perspective view of a vehicle having the present invention mounted thereon.

Referring to FIG. 1 the numeral 10 generally designates a vehicle having a vehicle front 12. In the vehicle front 12 is a grille opening 14 in which is mounted either a grille or a grille insert 16. The grille or grille insert 16 includes a plurality of grille holes 18 therein. While the grille holes 18 are shown in the drawings to be circular, they may also be of other shapes and configurations without detracting from the invention.

Within some of the grille holes 18 are mounted one or more grille lights 20. The grille lights 20 are shown adjacent the lateral edges of the grille insert 16, and this is the preferred configuration. However, other configurations of grille lights may be utilized without detracting from the invention.

The vehicle 10 also includes vehicle headlights 22 and vehicle turning lights 24 as well as vehicle running lights 26.

Figure 3:
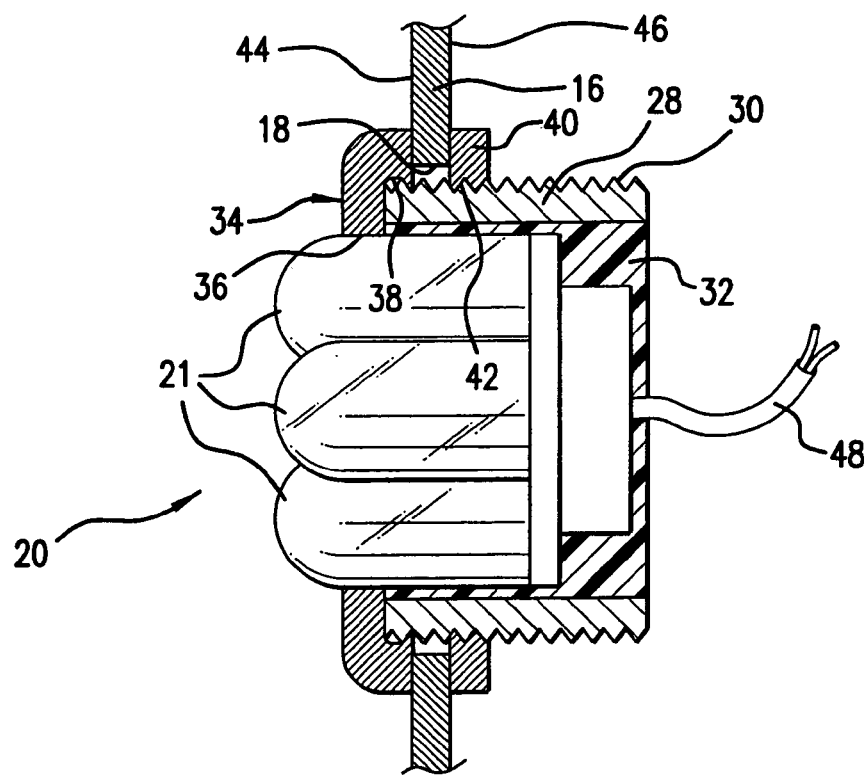
FIG. 3 is a sectional view taken along line 3—3 of FIG. 2.

Referring to FIGS. 2 and 3, each grille light 20 includes a plurality of LEDs 21. While LEDs 21 are shown in the preferred embodiment, other embodiments may include other types of lights that are electrically actuated without detracting from the invention. The LEDs 21 are mounted within a cylinder 28 having threads 30 on the outer cylindrical surface thereof. The cylinder 28 is hollow, and includes an epoxy or other moldable material 32 which attach the LEDs 21 within the cylinder 28.

A front nut 34 is threaded over the threads 30 on the outer surface of cylinder 28 at the front thereof and embraces and contacts the front face 44 of grille 16. Front nut 34 includes a circular opening 36 therein which surrounds the epoxy 36 and the LEDs 21 as shown in FIGS. 2 and 3. The front nut 34 includes internal front nut threads 38 which threadably engages the threads 30 of the front end of the cylinder 28.

A rear nut 40 includes rear nut threads 42 which threadably engage the threads 30 of cylinder 28 and which also engages the back surface or rear face 46 of grille 16. Thus front nut 34 and rear nut 40 embrace the grille or grille insert 16 therebetween and attach the grille light 20 to the grille 16.

Extending from the rear of the LEDs 21 are grille light wires 48. These grille light wires 48 are connected into the electrical system of the vehicle as shown by the schematic in FIG. 4.

Figure 4:
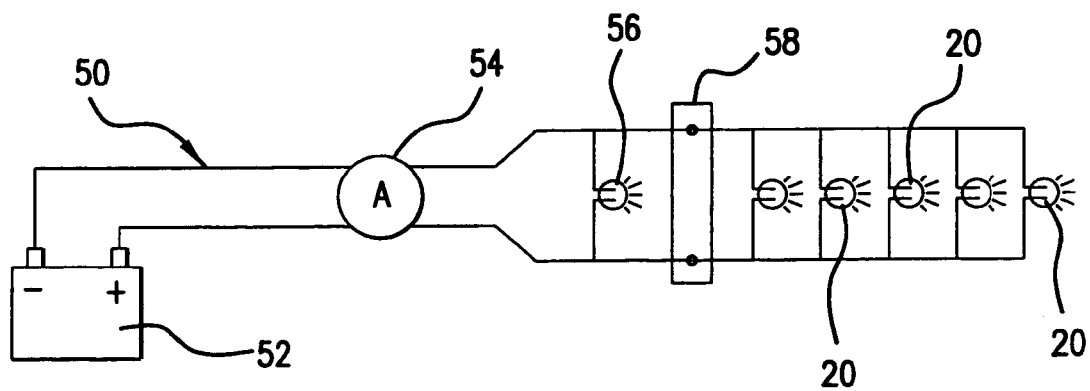
FIG. 4 is a schematic view of the electrical circuitry to which the grille light is connected.

In FIG. 4 is shown a vehicle light circuit 50 which includes a battery 52 and an alternator 54. Other electrical components may be included in this circuitry but these are shown for illustrative purposes. The vehicle light circuit 50 is connected to a vehicle light 56 which may be the turn signals 24 or the running lights 26 or the headlights 22.

A connector 58 connects the electrical circuit 50 to the plurality of grille lights 20. These grille lights 20 are connected to the vehicle light 56, and therefore can be made to be selectively actuated at the same time as vehicle light 56. It is possible to connect the grille lights 20 to the running lights 26, the turn signals 24, or the headlights 22. Vehicle light 56 represents any one of these three alternatives. It is also possible to connect the grille lights 20 directly to the battery 52 with a switch for independently turning on the grille lights 20.

While the vehicle lights 20 are shown to be LEDs 21, they can also be light bulbs of various shapes and sizes. Furthermore the configuration of the particular light 20 may be circular, or it may be other shapes or sizes depending upon the particular effect desired. The shape of the lights 20 may be circular, oblong, rectangular, square, or other configurations.

It is also possible to attach the lights 20 to the grille insert without inserting the lights into one of the holes 18. However it is preferred to mount the lights 20 within one of the holes 18 for the reason that it permits the wiring to lead out from the rear face of the vehicle grille.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstance may suggest or render expedient without departing from the spirit or scope of the invention as further defined in the following claims.

What is claimed is:

1. A combination comprising:
   a vehicle having a grille opening at the front thereof and having a light electrical circuit;
   a grille mounted within the grille opening, the grille comprising a plate-like material having a front face, a rear face, and a plurality of grille holes therein;
   a grille light mounted within one of the grille holes of the grille, the light being connected to the electrical circuit and being capable of selective actuation to activate the light; wherein the grill light includes a threaded cylinder extending through the hole and protruding from the front and rear faces of grill, a front nut being threaded over the cylinder protruding from the front face of the grille and a back nut being threaded over the cylinder protruding from the rear face of the grill.

2. The combination according to claim 1 wherein the grille light includes wires extending from the rear surface of the grille and being electrically connected into the light electrical circuit.

3. The combination according to claim 2 wherein the threaded cylinder surrounds one or more LEDs.

4. A lighting system for a vehicle having a grille opening on the front thereof, the lighting system comprising:
   a grille insert mounted within the grille opening, the grille insert comprising a plate-like material having a front face, a back face, and a plurality of grille holes therein;
   an electrical lighting circuit including at least one vehicle light adapted to be actuated for selective lighting;
   a grille light mounted within one of the grille holes of the grille insert and having grille light wires extending therefrom;
   the grille light wires being electrically connected to the electrical lighting circuit for causing the grille light to be actuated and lit simultaneously with the selective actuation of the one vehicle light; a cylinder within the one grill hole; said cylinder includes a front threaded end protruding from the front face of the grill insert and the back threaded end protruding from the back face of the grill insert, a front nut being threaded on the front threaded end of the cylinder and a back nut being threaded on the back threaded end of the cylinder.

5. The lighting system according to claim 4 wherein the front nut engages the front face of the grille insert and the back nut engages the back face of the grille insert to attach the grille light to the grille.

6. The lighting system according to claim 5 wherein the grille light wire protrudes from the back threaded end of the cylinder and one or more LEDs protrude from the from threaded end of the cylinder.

* * * * *

UNITED STATES PATENT AND TRADEMARK OFFICE
CERTIFICATE OF CORRECTION

PATENT NO.     : 6,986,597 B2
DATED          : January 17, 2006
INVENTOR(S)    : Elwell, James P.

It is certified that error appears in the above-identified patent and that said Letters Patent is hereby corrected as shown below:

Column 4,
Line 36, delete "from" insert -- front --.

Signed and Sealed this

Twenty-first Day of March, 2006

JON W. DUDAS
*Director of the United States Patent and Trademark Office*